United States Patent
Loo

(10) Patent No.: US 7,324,439 B2
(45) Date of Patent: Jan. 29, 2008

(54) APPLICATION-TRANSPARENT IP REDUNDANCY

(75) Inventor: William Loo, Kirkland (CA)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 1060 days.

(21) Appl. No.: 10/292,674

(22) Filed: Nov. 13, 2002

(65) Prior Publication Data

US 2004/0090912 A1 May 13, 2004

(51) Int. Cl.
- H04J 1/16 (2006.01)
- H04J 3/14 (2006.01)
- G01R 31/08 (2006.01)
- G06F 11/00 (2006.01)

(52) U.S. Cl. ............... 370/217; 370/392; 370/395.32; 370/219; 370/351

(58) Field of Classification Search ................ None
See application file for complete search history.

(56) References Cited

U.S. PATENT DOCUMENTS

| | | | | |
|---|---|---|---|---|
| 6,108,300 A | | 8/2000 | Coile et al. ............. | 370/217 |
| 6,148,410 A | * | 11/2000 | Baskey et al. ............. | 714/4 |
| 6,151,635 A | * | 11/2000 | Bare ............................ | 709/241 |
| 6,487,605 B1 | * | 11/2002 | Leung ....................... | 709/245 |
| 2002/0062388 A1 | * | 5/2002 | Ogier et al. ................ | 709/238 |
| 2002/0186653 A1 | * | 12/2002 | Jensen ........................ | 370/219 |

OTHER PUBLICATIONS

J. Moy, OSPF Version 2, Network Working Group, RFC 2328, Apr. 1998.
Internet Protocol, Darpa Internet Program, Protocol Specification, RFC 791, Sep. 1981.

\* cited by examiner

*Primary Examiner*—Chirag G. Shah
(74) *Attorney, Agent, or Firm*—Alex Nicolaescu, Ericsson Canada Inc.

(57) ABSTRACT

The present invention is directed to a method, a service node and a system for providing IP redundancy between a first service node and a second service node being mutually redundant. The first and the second service nodes are connected via a virtual connection. The first service node has a physical network interface to an IP node and a virtual network interface to the virtual connection. The first service node comprises a routing table having a cost associated with the virtual network interface. The method comprises steps of detecting by the first service node that the second service node is unavailable, updating in the routing table the cost from a higher value to a lower value and informing the IP node connected to the physical network interface of the update of the cost so as to process at the first service node traffic addressed to the second service node.

19 Claims, 5 Drawing Sheets

APPLICATION-TRANSPARENT IP REDUNDANCY

BACKGROUND OF THE INVENTION

1. Field of the Invention

The present invention relates to redundancy in Internet Protocol (IP) networks.

2. Description of the Related Art

In only a few years, Internet Protocol (IP) networks have proliferated and are now the most common type of network used in the telecommunications world. The simplicity and the efficiency of IP mainly contributed to this tremendous success. The IP world now faces the challenge of providing networking solutions for an ever-increasing number of needs, even though IP was not originally designed to fit these requirements. An example is the need for high availability of IP servers. IP does not provide any such redundancy mechanism.

A few solutions were proposed by the industry for responding to these specific needs. Most solutions are based on modifying IP applications to take into account redundancy needs. For example, the Dynamic Name Server (DNS) protocol requires each application to know the addresses of a primary DNS server and of a secondary DNS server both containing a common set of DNS entries. In case of failure of the primary DNS server, the application has first to acknowledge the lost of the primary DNS server and then contact the secondary DNS server to fulfill its DNS request. While this type of solution does provide redundancy for legacy services, applying the same concept to the development of the increasing number of new IP services and applications would be an undue burden. In other words, application-transparent IP redundancy mechanisms are still to be developed.

IP networks are widely known and have been, for example, described in the following request for comments (RFCs) documents of the Internet Engineering Task Force (IETF): RFC 791, RFC 792, RFC 919, RFC 922, RFC 950 and RFC 1112. These RFCs are also published by the IETF as Standard 5 (STD0005), which is herein included by reference.

Reference is now made to FIG. 1 that depicts one partial prior art solution for providing an application-transparent IP redundancy mechanism in an IP subnet 110 topology. FIG. 1 shows the IP subnet 110 containing a Primary IP Server 120, a Secondary IP Server 130 and a Router 140. The Primary IP Server 120 has a primary IP address valid in the subnet 110 and the Secondary IP Server 130 has a secondary IP address valid in the subnet 110. The Primary IP Server 120 and the Secondary IP Server 130 are connected with the router 140 through corresponding connections 172 and 174. The router 140, in turn, connects with another external network 180 through a connection 176. The router 140 receives traffic addressed to the primary IP address and forwards it through the connection 172 toward the Primary IP Server 120. The Primary IP Server 120 and the Secondary IP Server 130 use connections 172 and 174 to exchange information and assess the availability status of each other.

When a fault prevents traffic to reach the Primary IP Server 120, the prior art redundancy mechanism is activated by having the Secondary IP Server 130 taking over the responsibilities of the Primary IP server 120. This is achieved by assigning the primary IP address of the Primary IP Server 120 to the Secondary IP Server 130. When possible, the secondary IP address of the secondary IP Server 130 is assigned to the Primary IP Server 120. The purpose of this address swap is to allow the Secondary IP Server 130 to receive the traffic originally addressed to the Primary IP Server 120. The router 140 then forwards traffic addressed to the primary IP address on the connection 174 toward the Secondary IP Server 130. A major drawback of this solution is that the Primary IP Server 120 and the Secondary IP Server 130 must be in the same IP subnet 110 for the address swap to be possible. This limits the capabilities of the prior art redundancy mechanism since the IP subnet 110 must be located in one single physical location. Moreover, the address swap always represents a risk for the stability of the IP subnet 110 since both nodes could advertise the same IP address. This could happen, for example, when a node comes back online after a failure. Such a situation could lead to large latencies in the IP subnet 110 and render both nodes unreachable until the situation gets fixed.

As it can be appreciated, the prior art solutions do not provide an efficient redundancy mechanism in Internet Protocol (IP) networks that can be transparent to any IP application. The present invention provides such a solution.

SUMMARY OF THE INVENTION

The present invention is directed to a method for providing Internet Protocol (IP) redundancy between a first service node and a second service node being mutually redundant. The first and the second service nodes are connected via a virtual connection. The first service node has a physical network interface to an IP node and a virtual network interface to the virtual connection. The first service node comprises a routing table having a cost associated with the virtual network interface. The method comprises steps of detecting by the first service node that the second service node is unavailable, updating in the routing table the cost from a higher value to a lower value and informing the IP node connected to the physical network interface of the update of the cost.

The present invention is further directed to a first service node being mutually redundant with a second service node. The first service node comprises a physical network interface to an IP node, a processing component connected to the second service node and a routing component. The processing component comprises a status detection module capable of detecting that the second service node is unavailable. The routing component comprises a routing table including a cost of using a virtual connection to the second service node. The routing component is capable of updating the cost from a higher value to a lower value.

The present invention is yet further directed to a system including a first and a second service node being mutually redundant. The first service node comprises a physical network interface to an IP node, a processing component connected to the second service node and a routing component. The processing component comprises a status detection module capable of detecting that the second service node is unavailable. The routing component comprises a routing table including a cost of using a virtual connection to the second service node. The routing component is capable of updating the cost from a higher value to a lower value.

BRIEF DESCRIPTION OF THE DRAWINGS

A more complete understanding of the present invention may be had by reference to the following Detailed Description when taken in conjunction with the accompanying drawings wherein.

DETAILED DESCRIPTION OF THE PREFERRED EMBODIMENTS

Figure 1:
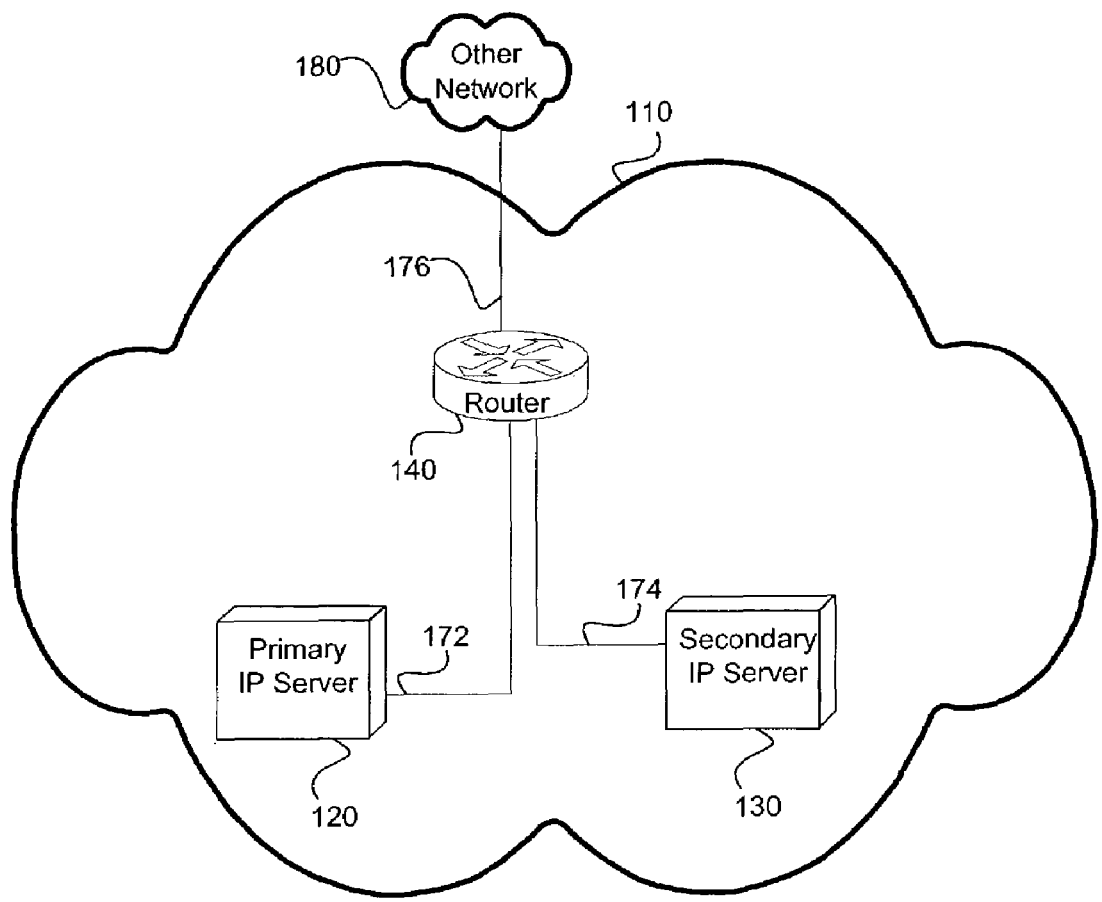
FIG. 1 depicts a prior art IP subnet topology providing an application-transparent IP redundancy mechanism.

The present invention takes advantage of Internet Protocol (IP) networks' infrastructure to provide an efficient redundancy mechanism that is transparent to any IP application. The present invention uses existing routing algorithms to affect routing of IP traffic toward the relevant redundant nodes. Open Shortest Path First (OSPF) algorithms, in the following discussion, are the exemplary routing protocol used to illustrate the innovative teachings of the present invention.

All aspects of OSPF used by the present invention are thoroughly described in the request for comments (RFC) number 2328 (RFC 2328) of the Internet Engineering Task Force (IETF), which is herein included by reference. While the purpose of the following discussion is not to present OSPF, an overview of some aspects of OSPF is presented hereinafter for the purpose of better illustrating the innovative teachings of the present invention.

In the following discussion, an Autonomous System (AS) refers to a group of routers exchanging routing information via a common routing protocol. Within the AS, routers are grouped into logical subsets of routers called OSPF areas. Each OSPF area mainly contains internal routers that only communicate within the OSPF area and area border routers enabling traffic to flow between OSPF areas. While other types of routers can be found in a given AS, they do not contribute to the understanding of the present invention.

A separate copy of the OSPF routing algorithm runs in each OSPF area. Routers having physical network interfaces to multiple OSPF areas run multiple copies of the OSPF routing algorithm. Each router also maintains a Link-state database showing each connection for each copy of the OSPF routing algorithm. In the Link-state database, a cost is associated with the output side of each network interface. This cost is configurable by the system administrator of the router. The lower the cost, the more likely the network interface is to be used to forward data traffic via the network interface.

When a router starts, it first initializes its Link-state database. The router then uses OSPF's Hello Protocol to acquire neighbors. The router sends Hello packets to the neighboring routers, and in turn receives their Hello packets. In the most common situations, the router dynamically detects its neighboring routers by sending its Hello packets to a preset multicast address. The Hello Protocol also elects a Designated router for the OSPF area.

The router then attempts to form adjacencies with some of its neighbors. Adjacencies control the distribution of routing information. Routing updates are sent and received only on adjacencies. Link-state databases are synchronized between pairs of adjacent routers through Link-state Advertisement (LSA) sent periodically. Link-state databases are also synchronized when a router's state changes. A router's adjacencies are reflected in the contents of its LSAs. This relationship between adjacencies and link state allows the protocol to detect dead routers in a timely fashion.

LSAs are flooded throughout the OSPF area. The flooding algorithm is reliable, ensuring that all routers in an area have exactly the same Link-state database. From this database, each router calculates a shortest-path tree, with itself as root. The tree gives the entire path to reach any destination network or host. The length or cost of each path is obtained by adding the cost of each router's interface used along the path to reach any destination network or host. Thus, each shortest-path of the shortest-path tree represents the lowest possible cost value toward the destination network or host. The shortest-path tree in turn yields a routing table for the protocol.

The routing table data structure contains all the information necessary to forward an IP data packet toward its destination. Each routing table entry describes the collection of best paths to a particular destination. When forwarding an IP data packet, the routing table entry providing the best match for the packet's IP destination is located. The matching routing table entry then provides the next hop towards the packet's destination. There is a single routing table in each router.

Figure 2:
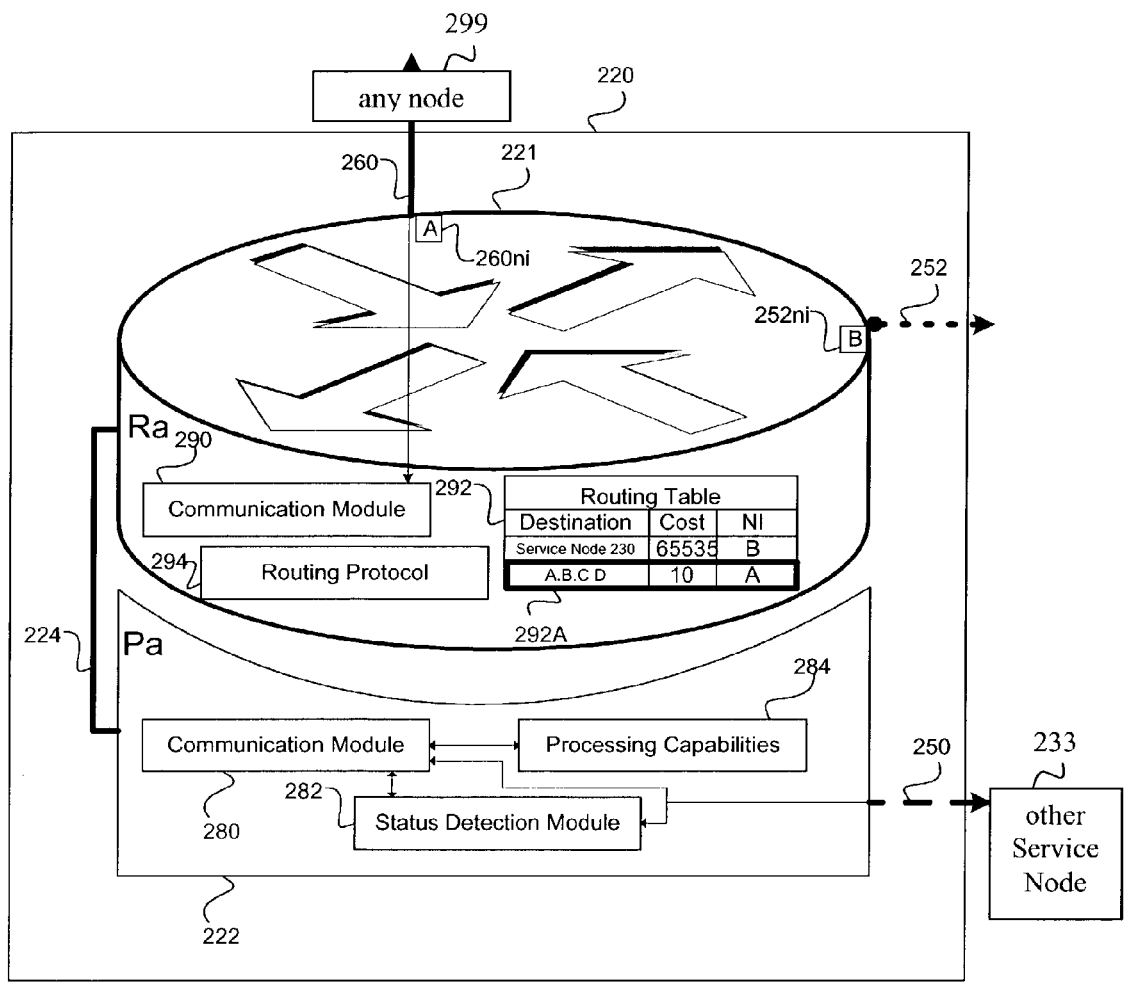
FIG. 2 is a modular representation of an exemplary service node enabling an application-transparent IP redundancy mechanism according to the preferred embodiment of the invention.

Reference is now made to FIG. 2, which is a modular representation of a service node 220 enabling an application-transparent IP redundancy mechanism according to the preferred embodiment of the present invention. The service node 220 is a generic platform for providing at least one IP service. Examples of IP services include HyperText Transfer Protocol (HTTP), email (or Simple Mail Transfer Protocol (SMTP)), Voice Over IP (VoIP), user authentication, data encryption, etc. IP services also include any type of electronic service encapsulated in IP such as music download, video broadcasting, etc. The service node 220 comprises two components. A routing component (Ra) 221 and a processing component (Pa) 222. The service node 220 has an IP address that is assigned to the routing component 221 of the service node 220. The routing component 221 receives IP traffic addressed to the service node 220. The routing component 221 and the processing component 222 are shown as two independent devices connected through a link 224. However, in some implementations, the routing component 221 and the processing component 222 may share the same environment thus avoiding the need for the link 224, wherein exchanges between the routing component 221 and the processing component 222 can be done via a shared memory (not shown). If the link 224 is needed, it is likely to be an IP link, but can also alternatively be any type of link using any known protocol as well as a proprietary protocol known only to the routing component 221 and the processing component 222.

The processing component 222 comprises a communication module 280, a status detection module 282 and a processing capabilities module 284. The processing capabilities module 284 is responsible for providing the IP service of the service node 220. The communication module 280 has capabilities for receiving requests related to the IP service from the routing component 221 on the link 224 and for directing the requests to the processing capabilities module 284. The communication module 280 also functions to receive answers to the requests from the processing capabilities module 284 and for directing the answers to the routing component 221 on the link 224. As mentioned earlier, the link 224 may not be a necessity. In such a case, the communication module 280 would have necessary capabilities to use a shared memory to communicate with the routing component 221.

The status detection module 282 communicates with at least another service node 233 through a link 250 on the processing component 221. It should be noted that any protocol could be used on the link 250. However, the link 250 is likely to be a dedicated connection using a point-to-point protocol (PPP) such as X.25. The status detection module 284 is used, as shown later on in the discussion, for implementing the application-transparent IP redundancy mechanism according with the preferred embodiment of the present invention.

The routing component 221 comprises a communication module 290, a routing table 292, a routing protocol 294 and a physical network interface A 260*ni* and a virtual network interface B 252*ni*. Only one physical interface A 260*ni* and one virtual network interface B 252*ni* are shown, but it should be understood that this only represents the minimum requirement for the application-transparent IP redundancy mechanism to work properly. The communication module 290 has capabilities for receiving traffic related to the IP service on an IP link 260 from any node 299 and for directing the requests to the processing component 222 on the link 224. The communication module 290 also has capabilities for receiving answers to the requests from the processing component 222 on the link 224 and for directing the answers to the node 299. As mentioned earlier, the link 224 may not be a necessity. In such a case, the communication module 290 would have necessary capabilities to use a shared memory to communicate with the processing component 222.

The routing protocol 294 of the routing component 221 is the core protocol used for providing IP routing capabilities to the service node 220. The following discussion is done with Open Short Path First (OSPF) algorithms (as described in RFC 2328) as an example of the routing protocol 294. It should be noted that any other routing protocol having a cost associated to each router's network interface could else be used. The routing protocol 294 provides capabilities to build and maintain the routing table 292. The routing protocol 294 can also be referred to in other documents as a protocol machine or a protocol agent. An example of the routing table 292 is shown on FIG. 2 filled with exemplary values. The routing table 292 comprises one routing table entry for each destination in the IP network 200. Each routing table entry gives an IP address of a given destination, a cost associated with reaching the given destination and a network interface (NI) corresponding to both the given destination and the associated cost. An exemplary routing table entry 292A is shown for a destination having a fictive IP address A.B.C.D. The exemplary destination is reachable through the physical network interface A 260*ni* at a cost of 10.

The present invention uses two service nodes as the service node 220 described with reference to FIG. 2, wherein the two service nodes are mutually redundant for the provision of at least one IP service, for providing an application-transparent IP redundancy mechanism. According to the invention, the two service nodes advertise a virtual connection there between in order to simulate that each service node can reach the other one via that virtual connection. The virtual connection can be viewed as an artifice used to make sure that, in case one of the service nodes becomes unavailable, any traffic addressed thereto will be routed toward the other available service node. The remaining available service node is then able to process the traffic in lieu of the unavailable service node without necessarily contacting the unavailable service node for that purpose. In order to do so, a cost associated with the utilization of the virtual connection in each service node is initially set as high as possible, avoiding the use of the connection by other nodes in normal network condition. When one of the service nodes becomes unavailable, the cost value related to the virtual connection therebetween is then changed to a reasonably low value, thus simulating the availability of the unavailable service node through the available service node. The present invention relies on the fact that both mutually redundant service nodes are so configured to be able to handle and respond to the service requests in similar manners, such as for example in the case of mirror IP servers.

Figure 3:
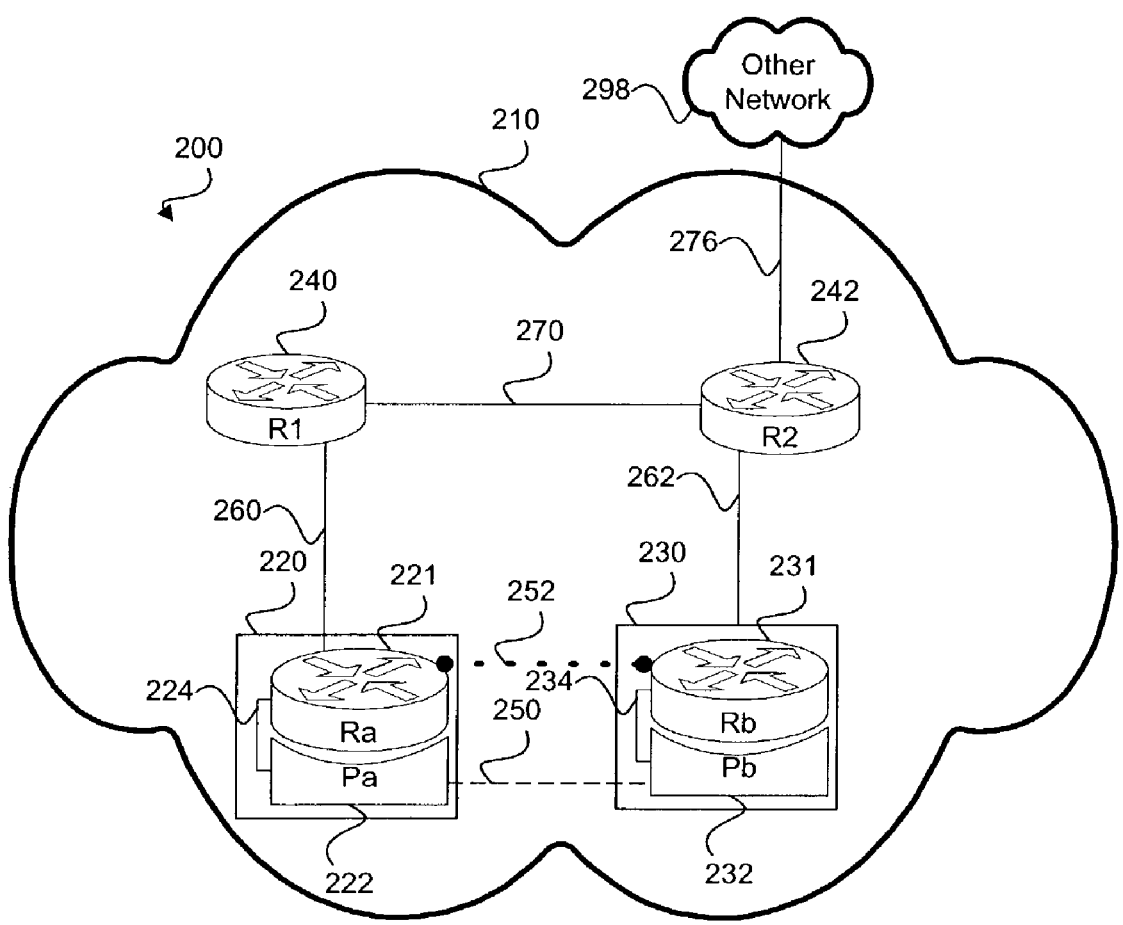
FIG. 3 depicts an exemplary IP network topology having a single Open Shortest Path First (OSPF) area providing an application-transparent IP redundancy mechanism according to the preferred embodiment of the invention.

Reference is now made concurrently to FIG. 2 and FIG. 3 showing an IP network 200 topology with a single Open Shortest Path First (OSPF) area 210 providing an application-transparent IP redundancy mechanism. FIG. 3 presents the service node 220 shown in FIG. 2. The IP link 260 connects the service node 220 with a router R1 240. The router 240 connects to another router R2 242 on an IP link 270. It should be understood that the number of intermediate routers used between the two shown routers R1 240 and R2 242 may vary and is typically only limited by the maximum number of routers supported by the routing protocol 294. The router 242 uses a connection 276 to another network 298 outside the OSPF area 210. Each router from the router R1 240 to the router R2 242 may use such connection. Again, for clarity purposes, only the R2 242 is shown connecting with the other network 298 outside the OSPF area 210. While the connection 276 is normally used in the OSPF area 210, its absence does not prevent the application-transparent IP redundancy mechanism from working.

The router 242 also connects to a service node 230 on an IP link 262. The service node 230 is similar to the service node 220. However, the routing component 231 comprises a routing table (not shown) of its own. The previously described link 250 is used to connect the processing component 222 of the service node 220 and the processing component 232 of the service node 230. A virtual link 252 exists between the routing component 221 and the routing component 231. The virtual connection 252 is used in the context of the application-transparent IP redundancy mechanism in a manner that is yet to be described.

The routing components 221 and 231 as well as the routers R1 240 and R2 242 use the same routing protocol 294, which is, in the present example, OSPF. In order to provide application transparent IP redundancy mechanism, the routing component 221 advertises, in its routing table 292, that it can reach the service node 230 through the virtual network interface B 252*ni* connected on the virtual connection 252. The information about the virtual connection 252 makes its way in all other adjacent routing tables (as described by OSPF) because the virtual connection 252 is shown in at least one routing table of the OSPF area 210.

In normal network condition where the both services nodes 220 and 230 perform normal their operations, the cost of the virtual network interface B 252*ni* toward the virtual link 252 is set high enough as to avoid receiving any traffic to be routed on the virtual connection 252. The routing component 231 does the same in its own routing table (not shown). The value of the cost in normal network condition is to be determined with reference to the routing protocol 294 and the network topology. In normal network condition, the cost of using the virtual connection 252 should be higher than the sum of costs associated with using the connections 260, 270 and 262. It is important to note that the connection 270 can be composed of multiple connections each having a given cost. There exist some cases where the cost of using the virtual connection 252 may be set to infinite value in routing tables. This would be the ideal situation for making sure the virtual link 252 is not used in normal network condition. However, putting the cost of using the virtual connection 252 as high as possible should be the best practice to use in all situations of normal network condition. In most implementations, the cost is encoded on 16 or 24 bits. In those cases, the high value would be equal to $2^{24}-1=16777215$ in cases where the cost is encoded in the routing table on 24 bits and $2^{16}-1=65535$ in cases where the cost is encoded in the routing table on 16 bits.

The processing component 222 of the service node 220 uses the status detection module 282 and the link 250 to monitor the processing component 232 of the service node 230. While any monitoring scheme may be used, the present invention preferably uses a heartbeat mechanism coupled with exchange of information. The heartbeat mechanism enables both processing nodes 222 and 232 to make sure the other processing component is alive and the exchange of information can be used to gather more information about status, traffic load, task request, etc. The link 250 may also be used in some implementations to synchronize both service nodes 220 and 230 together. The synchronization may be necessary for the application-transparent IP redundancy mechanism to work properly since the processing components 222 and 232 must be able to answer the same requests. In such a case, both processing components 222 and 232 should have access to similar data locally or remotely. This can be ensured by the synchronization performed through the communication modules of each the processing components 222 and 232 using the link 250. This is necessary when providing some IP services such as, for example, user authentication or email download.

Multiple events may lead to the initiation of the application-transparent IP redundancy mechanism. A first may be that a failure is detected by the status detection module 282 through the heartbeat mechanism by using the link 250. The type of failure that may be detected is described later on in this discussion. A second possibility may be that either one of the processing component 222 and 232 specifically requests the other one to take over its load through the status detection module 282 by using the link 250. The reaction of the application-transparent IP redundancy mechanism is the same for both possibilities as explained in the following lines.

Figure 4:
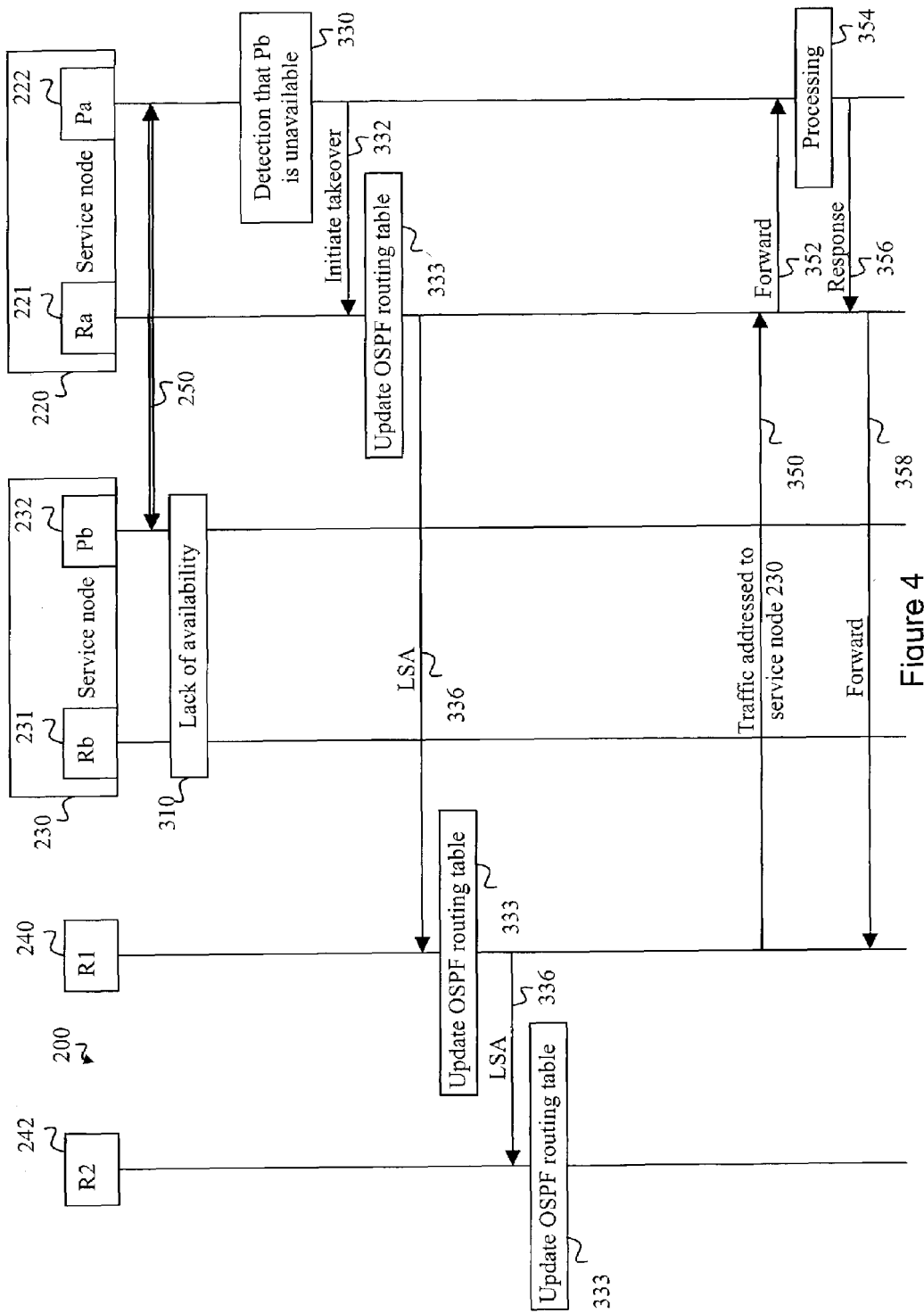
FIG. 4 is a nodal operation and signal flow diagram of an exemplary application-transparent IP redundancy mechanism through detection of a failure according to the preferred embodiment of the invention.

Reference is now made to FIG. 4, which is a nodal operation and signal flow diagram of an exemplary application-transparent IP redundancy mechanism. FIG. 4 shows the service node 220, the service node 230, the router R1 242 and the router R2 242 as described in FIG. 2 and FIG. 3. Of course, the two service nodes 220 and 230 could be interchanged without affecting the present invention. FIG. 4 exemplary illustrates a lack of availability 310 of the service node 230 for triggering the usage of the application-transparent IP redundancy mechanism.

The processing component 222 of the service node 220 first detects (step 330) through its status detection module that the processing component 232 is not available 310. The detection 330 can be the result of the monitoring scheme or a specific message from the processing component 232 stating that it is unavailable. The lack of availability 310 of the processing component 232 can be the result of multiple situations. For example, the processing component 232 may be disconnected from the routing component 231, the service node 230 or from the processing component 222. Another example is that the service node 230 itself is disconnected from the router R2 242. Yet another example is that the connection 262 is not reliable enough to continue using it.

Upon detection 330, the processing component 222, sends an initiate takeover message 332 to the routing component 221 through its communication module 280. The initiate takeover message 332 is sent on the link 224 or is placed in the appropriate shared memory between the two components 221 and 222 of the service node 220. The routing component 221 reacts to the initiate takeover message by updating in the routing table 292 (step 333) the cost of the routing component's virtual network interface B 252*ni* toward the virtual connection 252 to a low value. The low value is likely to be one (1), but only needs to be set low enough as to ensure the service node 230 is seen as reachable through the virtual connection 252. A cost value associated with using the connection 262 may also be updated to a value as high as possible. The update is done to reflect that the connection 262 should not be used anymore. For that purpose, according to OSPF, the routing component 231 would have to send an LSA message through the virtual link 252 stating that it cannot be reached thereby. However, the virtual connection 252 being virtual, the LSA message must be sent by the routing component 221. Thus, the LSA message is built at the routing component 221 as if it was issued by the routing component 231 of the service node 230. This is achieved by placing an OSPF identifier of the routing component 231 in the LSA message. If the cost value associated with using the connection 262 is not updated, a router will update it automatically after an expiration of a timeout as required by OSPF. This is normally performed by the router R2 242, but could be performed by any router directly or indirectly connected to the physical interface of the first service node following the expiration of the timeout. After its own updates, the routing component 221 then follows the appropriate OSPF procedure to inform all nodes connected to the physical network interface A 260*ni* of the update of the cost, thus updating all routing tables of the OSPF area 210. This is done by sending an LSA message 336 on each of its network interfaces A 260*ni* and B 252*ni*. In FIG. 4's example, the LSA message 336 is sent to the router 242. Each receiving router then follows the same procedure until each router in the OSPF area 210 is updated.

The service node 220 then starts receiving traffic 350 addressed to the service node 230. The traffic 350 is forwarded 352 from the routing component 221 to the processing component 222 and processed there (step 354) on behalf of the processing component 232. After processing 354, a response 356 is sent to the routing component 221 and then forwarded 358 toward its destination as if it was issued by the service node 230. As explained earlier, the present invention relies on the fact that both mutually redundant service nodes 220 and 230 can handle the same requests leading to the same results, even though the processing method could be different. This becomes especially important when two backward compatible versions of service nodes 220 and 230 are made mutually redundant.

Figure 5:
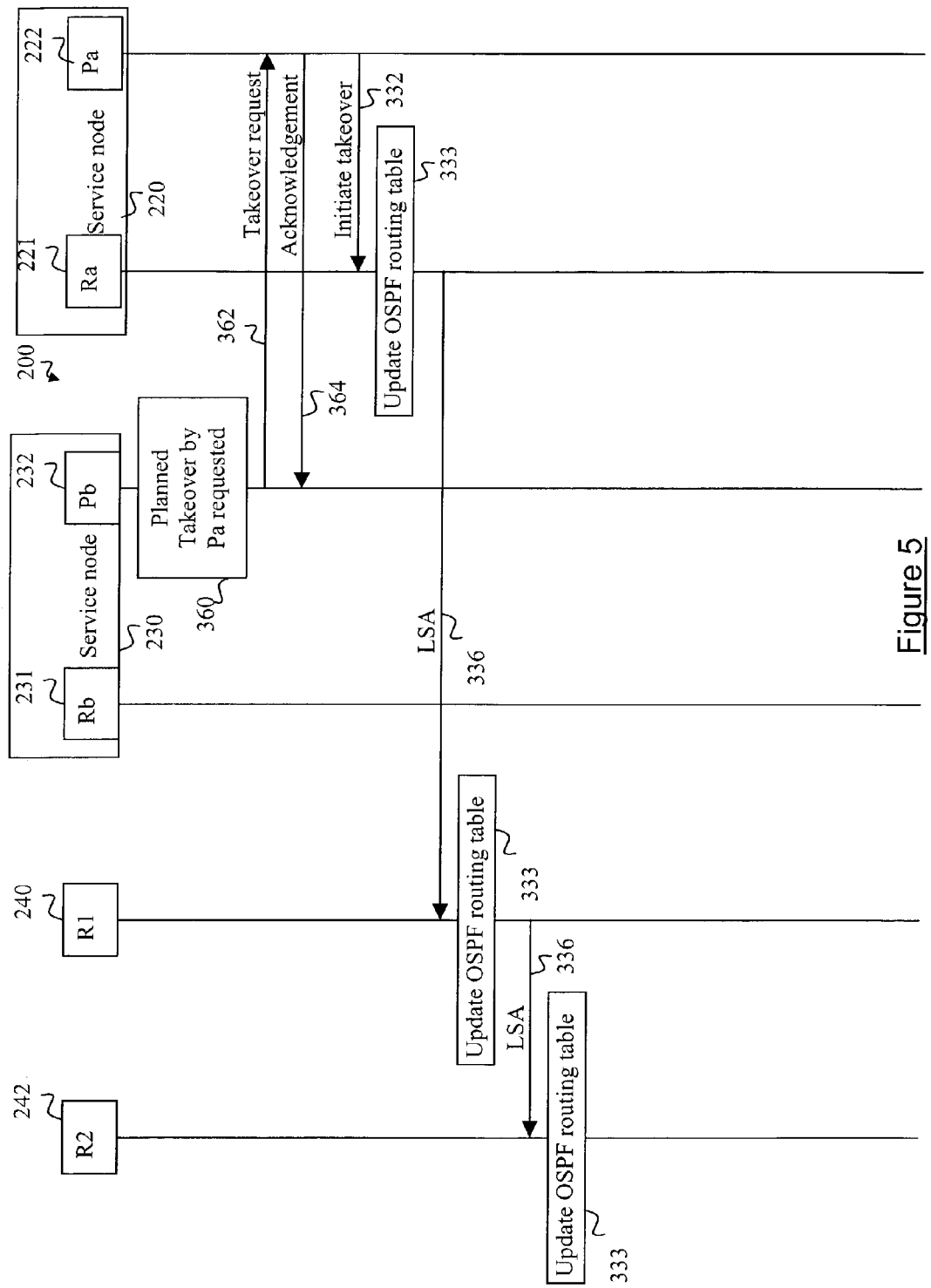
FIG. 5 is a nodal operation and signal flow diagram of an exemplary application-transparent IP redundancy mechanism according to the preferred embodiment of the invention.

Reference is now made to FIG. 5, which is a nodal operation and signal flow diagram of a planned usage of the application-transparent IP redundancy mechanism specifically requested by the service node 230 (step 260). FIG. 5 shows the service node 220, the service node 230, the router R1 242 and the router R2 242 as described in FIG. 2 and FIG. 3. FIG. 5 shows the service node 220, the service node 230, the router R1 242 and the router R2 242 as described in FIG. 2 and FIG. 3. In FIG. 5's example, the processing component 232 sends a takeover request 362 to the processing component 222, which, in turn, answers with an acknowledgement message 364. The mechanism then functions as described in FIG. 4 (steps 332-336).

The previous discussion was done with only one OPSF area 210. However, the application-transparent IP redundancy mechanism works with multiple OPSF areas as long as there is a free flow of information between the routers involved in the application-transparent IP redundancy mechanism. For this requirement to be met, the routers R1 240 and R2 242 must be areas border routers and member of a unique backbone OSPF area. The routing component 221 must be directly connected to the router R1 240 and the routing component 231 must also be directly connected to the router R2 242. The technique used is then to enlarge the backbone area to include the routing component 221 and the routing component 231. The same enlargement technique may be used if only one of the routing component 221 and 231 is outside the backbone area. This ensures that routing table updates travel freely between each router involved in the application-transparent IP redundancy mechanism. Any other scheme answering this liberty of circulation would be sufficient to make the present invention works. This is of particular relevance if another routing protocol 294 is used instead of OSPF.

The innovative teachings of the present invention have been described with particular reference to numerous exemplary embodiments. However, it should be understood that this class of embodiments provides only a few examples of the many advantageous uses of the innovative teachings of the invention. In general, statements made in the specification of the present application do not necessarily limit any of the various claimed aspects of the present invention. Moreover, some statements may apply to some inventive features but not to others. In the drawings, like or similar elements are designated with identical reference numerals throughout the several views, and the various elements depicted are not necessarily drawn to scale.

What is claimed is:

1. In an Internet Protocol (IP) network, a first service node being redundant to a second service node, the second node being connected towards an IP node through a normal-condition connection, the first service node comprising:
   a physical network interface connected towards the IP node through a redundant-condition connection;
   a virtual network interface representing a virtual connection towards the second service node, wherein the virtual connection is an artificial connection that cannot be used to route traffic;
   a processing component that comprises a processing capabilities module capable of processing traffic addressed to the first service node on behalf of the second service node; and
   a routing component comprising a routing table including a cost of using the virtual connection towards the second service node, the cost of using the virtual connection being set such that the sum of the cost of using the virtual connection and cost associated with using the redundancy-condition is higher than the cost associated with using the normal-condition connection.

2. The first service node of claim 1, wherein the processing capabilities module is further capable of responding to the traffic addressed to the second service node as if the response was issued from the first service node.

3. The first service node of claim 1, wherein the processing component further comprises a status detection module capable of detecting that the second service node is unavailable.

4. The first service node of claim 3, wherein the status detection module further receives a message from the second service node requesting a takeover by the first service node for processing traffic addressed to the second service node.

5. The first service node of claim 1, wherein the routing component is further capable of:
   updating the cost from a higher value to a lower value; and
   informing the IP node connected to the physical network interface of the update of the cost.

6. The first service node of claim 5, wherein the higher value is a numerical value set as to avoid receiving any traffic to be routed from the first service node to the second service node during normal operation of the second service node.

7. The first service node of claim 5, wherein the higher value comprises a value selected from the group of values consisting of:
   $2^{24}-1=16777215$; and
   $2^{16}-1=65535$.

8. The first service node of claim 5, wherein the lower value is a numerical value set as to ensure the second service node is perceived as reachable by the IP Node.

9. The first service node of claim 5, wherein the lower value is 1.

10. A method for providing Internet Protocol (IP) redundancy for a first service node by a second service node, wherein the first service node has a physical network interface enabling connection towards an IP node via at least one normal-condition connection and wherein the second node has a physical network interface enabling connection towards the IP node via at least one redundancy-condition connection, the method comprising steps of:
    in the second node, maintaining a routing table advertising a virtual connection towards the first node, wherein the virtual connection is an artificial connection that cannot be used to route traffic;
    in the second node, setting a cost value of using the virtual connection towards the first node such that the sum of the cost value of using the virtual connection and at least one cost associated with using the redundancy-condition connection is higher than the sum of at least one cost associated with using the normal-condition connection;
    in the second node, receiving traffic from the IP node addressed to the first node and meant to be sent on the virtual connection; and
    in the second node, processing the traffic on-behalf of the first node.

11. The method of claim 10 further comprising a step of, responding to the traffic towards the IP node as if it was issued by the first node.

12. The method of claim 10 further comprising a step of, before receiving traffic from the IP node, receiving at the second service node an incoming message from the first node requesting a takeover comprising processing by the second node traffic addressed to the first node.

13. The method of claim 12 further comprising updating, from the second node, at least one of the cost values of the normal-condition connection to a higher value.

14. The method of claim 10 further comprising a step of, before receiving traffic from the IP node, detecting, in the second node, that the first node is unavailable.

15. The method of claim 14 further comprising a step of, in response to the step of detecting, updating, from the second node, at least one of the cost values of the normal-condition connection to a higher value.

16. The method of claim 14 further comprising a step of, in response to the step of detecting, updating, in the second node, the cost value of using the virtual connection from a higher value to a lower value.

17. The method of claim 10 farther comprises a step of, before receiving traffic from the IP node, updating from the first node, at least one of the cost values of the normal-condition connection to a higher value.

18. The method of claim 10 wherein the method farther comprises a step of, before receiving traffic from the IP node, updating though a normal operation of the routing protocol used between the IP node and the first node, at least one of the cost values of the normal-condition connection to a higher value.

19. The method of claim 10 wherein the first node consists of a router and a service node, wherein the step of processing is performed by the service node and the step of setting the cost value is performed by the router.

* * * * *

UNITED STATES PATENT AND TRADEMARK OFFICE
CERTIFICATE OF CORRECTION

PATENT NO. : 7,324,439 B2 Page 1 of 1
APPLICATION NO. : 10/292674
DATED : January 29, 2008
INVENTOR(S) : Loo It is certified that error appears in the above-identified patent and that said Letters Patent is hereby corrected as shown below:

In Column 11, Line 12, in Claim 17, delete "farther" and insert -- further --, therefor.

In Column 12, Line 1, in Claim 18, delete "farther" and insert -- further --, therefor.

Signed and Sealed this

Twenty-third Day of September, 2008

JON W. DUDAS
*Director of the United States Patent and Trademark Office*